US005568680A

United States Patent [19]

Parker

[11] Patent Number: 5,568,680

[45] Date of Patent: Oct. 29, 1996

[54] METHOD FOR MAKING A REFLECTOR FOR A LUMINAIRE

[75] Inventor: Andrew J. Parker, Chapel Hill, N.C.

[73] Assignee: Regent Lighting Corporation, Burlington, N.C.

[21] Appl. No.: 378,630

[22] Filed: Jan. 26, 1995

[51] Int. Cl.[6] .................................................. B23P 13/04

[52] U.S. Cl. .......................... 29/557; 72/379.2; 362/347; 428/596

[58] Field of Search ............................ 29/505, 513, 557; 72/335, 379.2; 428/577, 596; 362/341, 347, 349

[56] References Cited

U.S. PATENT DOCUMENTS

| | | | |
|---|---|---|---|
| 1,734,356 | 11/1929 | Welch | 428/596 |
| 3,265,349 | 8/1966 | Hamrick | 29/513 |
| 4,206,266 | 6/1980 | Bellinger | 428/596 |
| 4,570,203 | 2/1986 | Daniels et al. | 362/347 |

*Primary Examiner*—David P. Bryant

[57] ABSTRACT

This method for making a luminaire reflector comprises: (a) providing a sheet of metal having two generally parallel edges and a mid-plane extending perpendicular to said edges; (b) cutting from this sheet a blank that comprises (i) two primary portions, each in the shape of a trapezoid having a major base extending along one edge of the sheet, a minor base spaced from the major base, side edges extending between the ends of the major and minor bases, (ii) a junction portion interconnecting the minor bases, and (iii) end-paneling portions at opposite sides of the mid-plane, each of the end-paneling portions comprising a plurality of sections, one section joined to a side edge of one of the primary portions, another section joined to a side edge of the other primary portion and a third section joined to the junction portion. The method further comprises the additional steps of: (a) bending the blank into a U-shaped form wherein the primary portions constitute the arms of a trough-shaped reflector body, and the junction portion forms a bight joining the arms at one end of the arms, and (b) bending the blank at each of the side edges where an end paneling section is joined to a primary portion and where each of the third sections is joined to said junction portion so that the sections of end paneling at each side of the mid-plane meet to form an end wall of the reflector.

4 Claims, 4 Drawing Sheets

METHOD FOR MAKING A REFLECTOR FOR A LUMINAIRE

TECHNICAL FIELD

This invention relates to a method for making a reflector for a luminaire and, more particularly, relates to a method of this type in which a blank of special configuration is cut from a sheet of metal and is then bent into a trough-shaped form (constituting the body of the reflector) and end walls located at opposite ends of the trough-shaped body (constituting the end panels of the reflector).

BACKGROUND

In manufacturing luminaire reflectors on a mass-production basis, it is highly desirable that the amount of material consumed and the required tooling and labor be held to a minimum. In attempting to achieve such goals, it is a common practice to stamp from a sheet of metal a blank that can be bent into a trough-shaped form constituting the body of the reflector and integral end walls at opposite ends of the body constituting the end panels of the reflector. In prior uses of such a method, the blank cut from the metal sheet comprises two primary portions, each in the general form of a trapezoid having major and minor bases and side edges extending between the ends of the bases, the two trapezoidal primary portions being located with their minor bases aligned but spaced apart and joined by a junction portion having side edges extending between the ends of minor bases. Typical forms of this prior blank have further comprised, at each side of the junction portion, a secondary portion in the general form of a trapezoid having its minor base joined to the associated side edge of said junction portion. This blank is formed into a trough-shaped reflector by bending the blank at the minor bases of the trapezoidal portions so that the two primary portions form the body of the reflector and the two secondary portions form the end walls of the reflector.

A disadvantage of this prior method is that a blank of the described configuration requires a starting sheet of unduly large area.

OBJECTS

An object of my invention is to reduce the area of the sheet metal starting sheet required for making the reflector (as compared to that required by the above-described prior method) without reducing the effective area of the final reflector.

Another object is to reduce the amount of scrap material that results from making a reflector of this general type using a manufacturing method of the general type referred to hereinabove under "Technical Field".

Still another object is to achieve the above objects with a reflector-manufacturing method that is economical in terms of the required tooling and labor costs.

SUMMARY

In carrying out the invention in one form, I provide a method for making a luminaire reflector that comprises a trough-shaped body adapted to receive a lamp and end walls at opposite ends of the body, the trough-shaped body comprising spaced-apart arms and a bight joining the arms at one end of the arms, the arms at their opposite end defining an opening through which light from the lamp is projected by the reflector. This method comprises the following steps: (a) providing a sheet of metal having two generally parallel edges and a mid-plane extending perpendicular to said edges; (b) cutting from said sheet a blank that comprises (i) two primary portions each in the shape of a geometric figure having a major base extending along one of the edges of the sheet, a minor base spaced from said major base, and side edges extending between the ends of said major and minor bases via generally convergent paths, (ii) a junction portion interconnecting said minor bases, and (iii) end-paneling portions at opposite sides of said mid-plane, each end-paneling portion comprising three spaced-apart sections, one joined to a side edge of one of said primary portions, another joined to a side edge of the other of said primary portions, and a third section joined to said junction portion; (c) bending the blank into a U-shaped form wherein said primary portions constitute the arms of the trough-shaped body and the junction portion constitutes the bight of the body; and (d) bending said blank at each of said side edges where an end paneling section is joined to a primary portion and where each of the third sections is joined to said junction portion so that the sections of end paneling at each side of said mid-plane meet to form one of said end walls of the reflector.

BRIEF DESCRIPTION OF FIGURES

For a better understanding of the invention, reference may be had to the following detailed description of several forms of the invention taken in connection with the accompanying drawings, wherein.

DETAILED DESCRIPTION OF EMBODIMENTS

Figure 1:
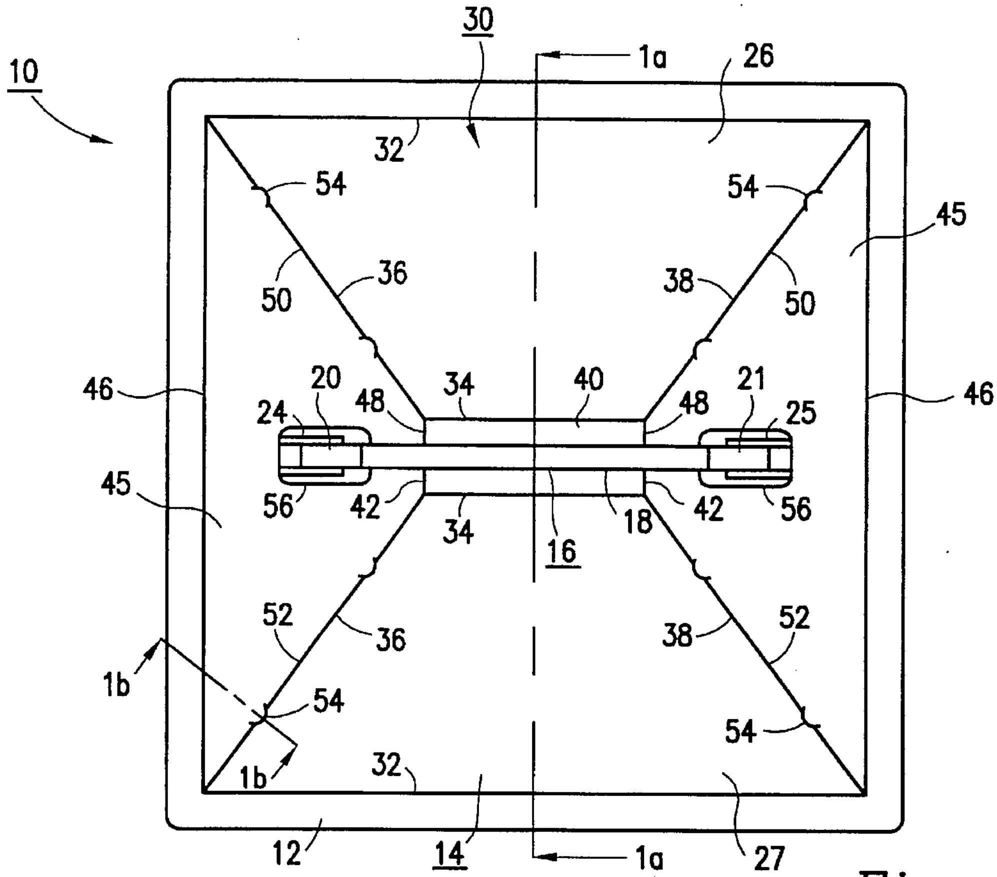
Fig. 1 (PRIOR ART)
FIG. 1 is a front view of a luminaire including a reflector made by a prior art method.
Figure 1A:
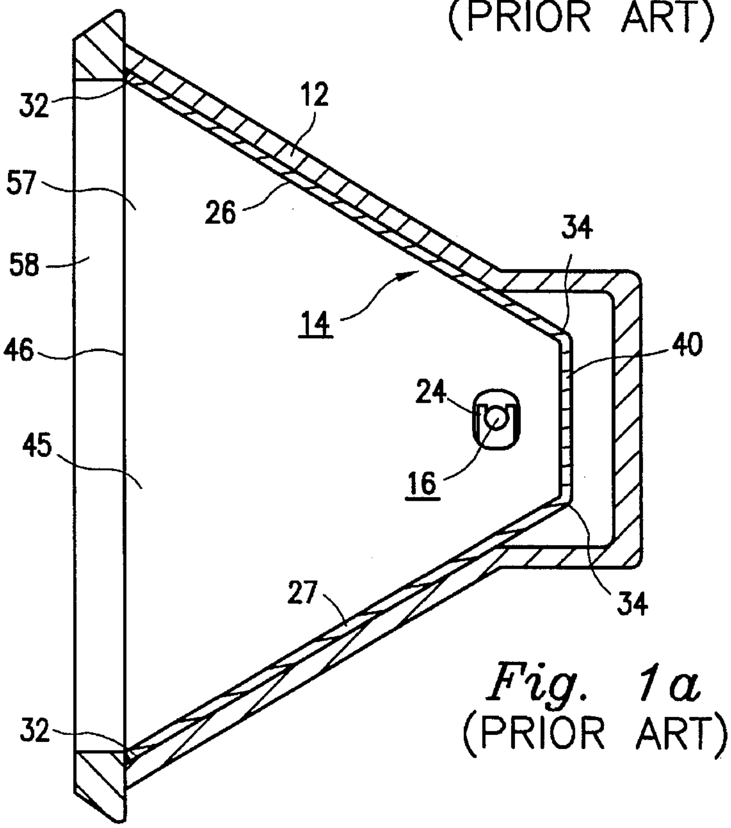
Fig. 1a (PRIOR ART)
FIG. 1*a* is a sectional view of the luminaire of FIG. 1 taken along the line 1*a*—1*a* of FIG. 2.

Referring now to FIGS. 1 and 1*a*, there is shown a luminaire 10 comprising a metal housing 12 and a trough-shaped sheet metal reflector 14 mounted within the housing 12. The luminaire further comprises a lamp 16 of the double-ended quartz type mounted within the trough-shaped reflector. The lamp 16 comprises a light-transmitting tube 18, conductive terminals 20 and 21 at opposite ends of the tube, and a filament (not shown) within the tube connected between the terminals. Sockets 24 and 25 mounted on the housing 12 respectively receive the terminals 20 and 21 and connect the lamp in the electric circuit through the luminaire.

The reflector 14 comprises a body 30 comprising (i) upper and lower arms 26 and 27, each generally in the form of a trapezoid having a major base 32 and a minor base 34 and side edges 36 and 38 connecting the ends of the two bases and (ii) a junction, or bight, portion 40 integrally connecting the arms 26 and 27 between the two minor bases 34. The junction portion 40 has side edges 42 at its laterally opposed sides extending between the ends of the two minor bases 34.

Joined to the junction portion 40 at its side edges 42 are two secondary portions 45 that form end panels for the reflector. These secondary portions 45 are each in the general form of a trapezoid having a major base 46 and a minor base 48. The minor base 48 is integrally joined to the juxtaposed side edge 42 of the junction portion 40. Each of the secondary portions 45 has side edges 50 and 52 at its opposite sides extending between the ends of its major and minor bases 46 and 48.

Figure 1B:
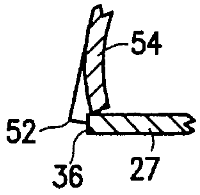
Fig. 1b (PRIOR ART)
FIG. 1*b* is a sectional view taken along the line 1*b*–1*b* of FIG. 1.

As seen in FIG. 1, the side edges 50 and 52 of the right-hand end panel 45 are located in juxtaposition to the side edges 38 of the upper and lower arms 26 and 27, and the side edge 50 and 52 of the left-hand end panel are located in juxtaposition to the side edges 36 of the upper and lower arms 26 and 27. To assist in holding these side edges in their illustrated positions, small projections 54 in the side edges of the end panels are provided for engaging the arms 26 and 27 immediately adjacent their side edges. Typically, these projections 54 are in the form of fingers cut from one of the side edges and bent away from the adjoining material of the side edge, as shown enlarged in FIG. 1*b*.

Referring again to FIG. 1, the end panels 45 contain openings 56 through which the sockets 24 and 25 project for a short distance. The terminals 20 and 21 of the lamp 16 are received in the projecting portions of these sockets.

Referring to FIG. 1*a*, the reflector has a large opening 57 at its left-hand side disposed between the left-hand ends of its upper and lower arms 26 and 27. Referring still to FIG. 1*a*, this opening 57 is positioned in alignment with an opening 58 at the left-hand side of the luminaire housing 12. Light generated by the lamp 16 is projected by the reflector 14 through these openings 57 and 58 to provide the desired illumination. Typically, a transparent lens (not shown) is present in the opening 58 to close-off the interior of the luminaire and to direct the projected light in the desired paths.

Figure 2:
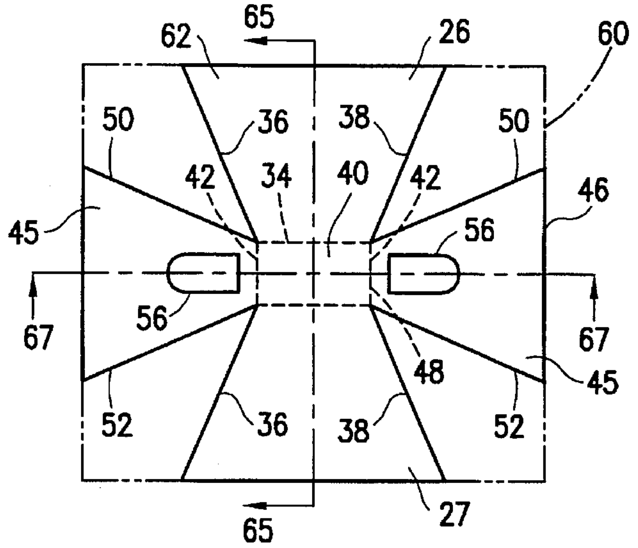
Fig. 2 (PRIOR ART)
FIG. 2 illustrates the sheet-metal blank from which the reflector of FIG. 1 is formed.

The reflector 14 of FIGS. 1 and 1*a* is typically made from a flat rectangular sheet of metal such as shown in dot-dash lines at 60 in FIG. 2. A blank 62 having the shape shown in solid lines in FIG. 2 is stamped from the metal sheet 60 and is then bent into the form of the trough-shaped reflector 14 of FIGS. 1 and 1*a*. Such bending is effected by folding the arms 26 and 27 of the FIG. 2 blank toward each other along the dotted lines 34 of FIG. 2 to produce a form of U-shaped cross-section when viewed from the plane 65 of FIG. 2, following which the side panels 45 are folded toward each other along the dotted lines 42 to develop a U-shaped cross section when viewed from the plane 67 of FIG. 2. The extent of this folding or bending is such as to cause the side edges of the arms and side edges of the end panels to touch, as is the case in the finished reflector 14 of FIGS. 1 and 1*a*.

One of the objects of my invention is to reduce the area of the starting sheet (60) required to form the reflector as compared to that required by the prior-art method described above. I have found that I can achieve this goal without reducing the effective size of the reflector by utilizing, for such reflectors, blanks of the shape shown in FIG. 3. Each of the blanks of FIG. 3 comprises two arms 26 and 27 of the same size and shape as present in FIG. 2 and a junction portion 40 between the two arms of the same size and shape as in FIG. 2. More specifically, in the FIG. 3 embodiment, each of the arms 26 and 27 is in the shape of a geometric figure, i.e., a trapezoid, having a major base 32 extending along one edge of the sheet 60 and a minor base 34 extending generally parallel to the major base and spaced therefrom. Each trapezoidal arm has side edges 36 and 38 extending between the ends of the major and minor bases 32 and 34 via convergent paths. The minor bases 34 of the two trapezoidal arms 26 and 27 are substantially aligned, and there is a mid-plane 65 extending perpendicular to the major bases 32.

Figure 3:
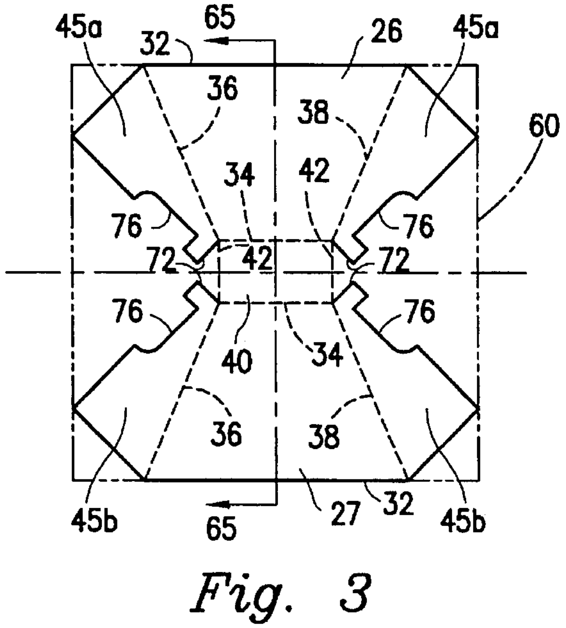
FIG. 3 illustrates a sheet-metal blank used in practicing one form of my invention.

In the embodiment of FIG. 3, each of the portions of the blank used for an end panel is split into two spaced-apart halves 45*a* and 45*b*. One half 45*a* is joined to the upper arm 26 at one of its side edges (e.g., 38), and the other half 45*b* is joined to the lower arm 27 at one of its side edges (e.g., 38). This same approach is used at both sides of the arms 26 and 27 of the blank. The blank is bent into the reflector form by folding it along the dotted lines 34 to produce a U-shaped form as viewed from the plane 65. Then the blank is folded along the dotted lines 36 and 38 to provide end panels for the U-shaped form. This folding action brings the bottoms 72 of the end-panel halves into juxtaposition with the side edges 42 of the junction portion 40.

An advantage of the blank configuration of FIG. 3 is that it permits a reduction of about 12% in the area of the rectangular starting sheet 60 as compared to the area of rectangular starting sheet 60 of FIG. 2. Another advantage of using the approach of FIG. 3, i.e., splitting the end-panel portions into halves unattached to junction portion 40, is that the bottoms 72 of the end panel halves can be rounded to conform more closely to the shape of a reflector with a junction portion 40 that has a rounded, or more nearly parabolic configuration, as will be described hereinafter in connection with the FIG. 6 embodiment.

In FIG. 3, the holes in the end panels for receiving the two sockets (24 and 25 of FIG. 1) can each be formed by stamping out from an edge of each end-panel half a notch 76 conforming in shape to half that of the hole. When the end-panel halves are folded as above described, e.g., along dotted lines 36 and 38, the confronting edges of the end-panel halves are brought together and a hole of the appropriate shape is formed in the resulting end panel.

Figure 4:
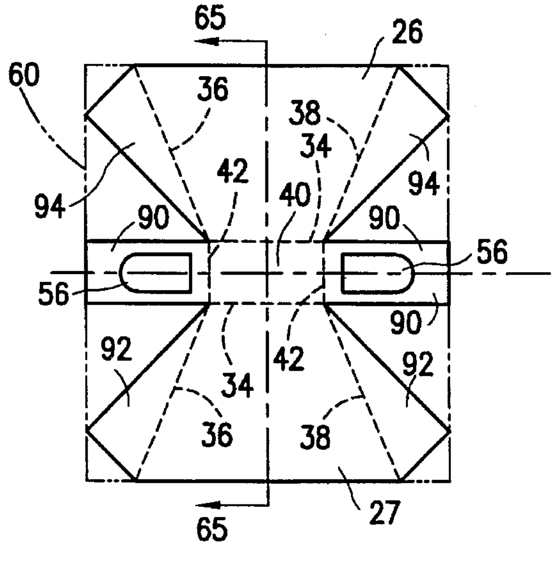
FIG. 4 illustrates another sheet-metal blank used in practicing a modified form of the invention.

In the modified blank of FIG. 4, the body of the reflector is essentially the same as in the FIG. 3 embodiment, i.e., comprising two arms 26 and 27, each generally in the form of a trapezoid, the arms being connected by a junction portion 40 extending between the minor bases of the two trapezoids. But the end-panel portions of the FIG. 4 embodiment differ from the end-panel portions in the FIG. 3 embodiment. Each of the FIG. 4 end-panel portions is divided into three parts. One of these three parts is a rectangular central portion 90 joined to the junction portion 40 at one side edge 42 of the junction portion 40. Another of these parts is a first triangular end-panel portion 92 joined to the lower arm 27 of the body at the right-hand side edge 38 of the lower arm 27; and the other of these parts is a second triangular portion 94 joined to the upper arm 26 of the body at the right-hand side edge 38 of the upper arm 26.

On the opposite side of the central plane 65 of the blank of FIG. 4, the end-panel portion is divided into three parts corresponding in size and shape to the three parts at the right-hand side.

The blank of FIG. 4 is bent into a trough-shaped reflector by first folding it along the dotted lines 34 to produce a U-shaped form as viewed from the plane 65, and then the three end-panel components 90, 92, and 94 at each side of the blank are folded along the dotted fold lines (38, 42, and 38) and (36, 42, 36), respectively, to produce each of the end panels of the U-shaped form. In each end panel the hole 56 in central portion 90 acts a socket-receiving opening, as in FIG. 1.

The area of required sheet metal material in the FIG. 4 embodiment (indicated by rectangle 60) is about 21% less than that of the FIG. 2 embodiment. In order to achieve a reduction of this magnitude in the FIG. 4 embodiment, it has been necessary to slightly shorten the central components 90 of the end panels, slightly reducing the total reflector area. But it appears that the absence of end panel in this restricted end region does not significantly impair the efficiency of the reflector.

Figure 5:
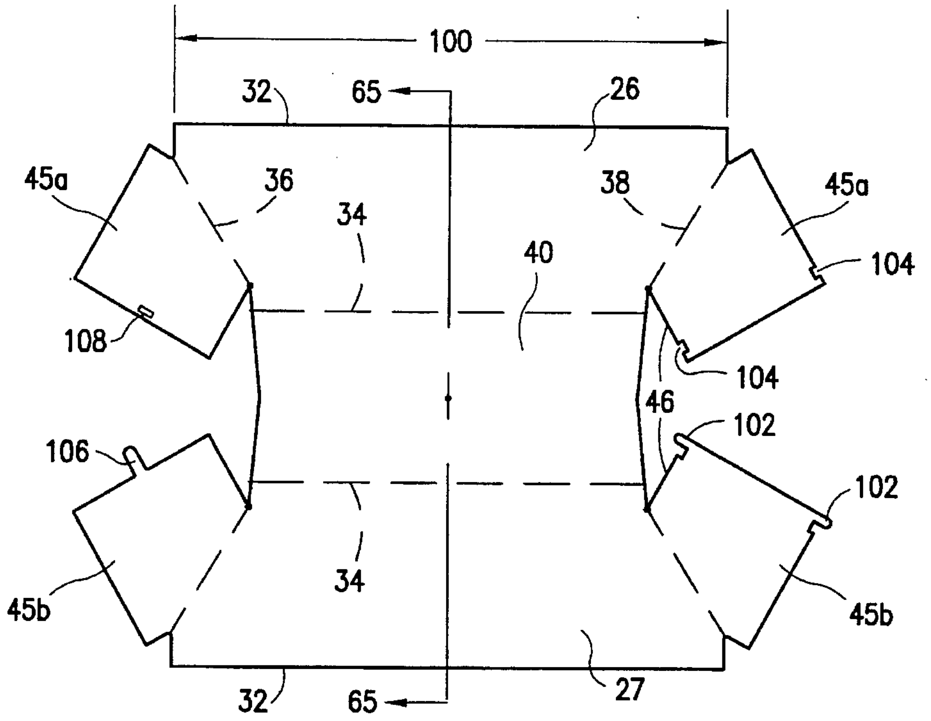
FIGS. 5 and 6 illustrate still other sheet-metal blanks used in practicing additional forms of the invention.
Figure 5A:
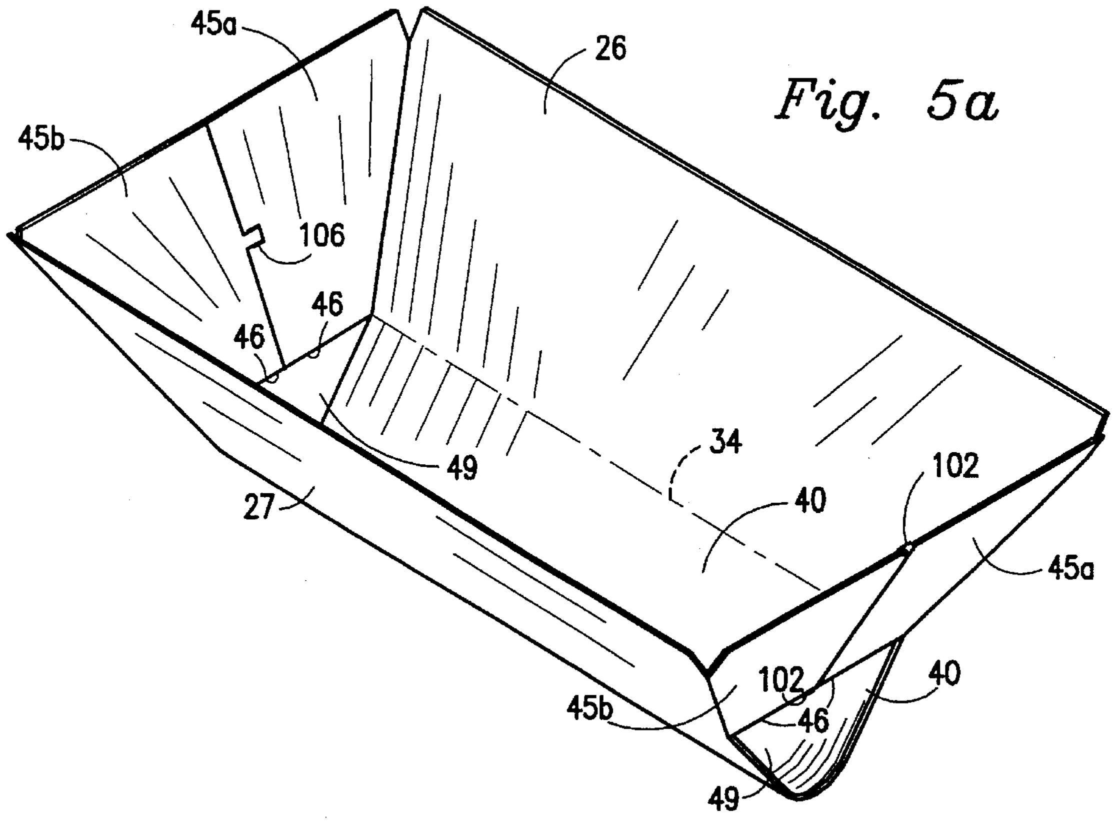
FIG. 5*a* is a simplified perspective view of a reflector made from the blank of FIG. 5.

The blank shown in FIG. 5 is similar in many respects to that shown in FIG. 3, in both cases including end-panel halves 45*a* and 45*b* joined to the trapezoidal arms 26 and 27 at the side edges of the arms. The FIG. 5 blank, however, is configured for use in a luminaire housing that is relatively long in the direction 100 as compared to its dimension transverse to the direction 100. Also, the FIG. 5 blank has a more pronounced junction portion 40 than the FIG. 3 blank. This allows the FIG. 5 blank to be bent into a reflector with a rounded bottom, the overall shape of which approaches more closely the parabolic ideal. FIG. 5*a* is a simplified perspective view of such a reflector. Referring to FIG. 5*a* the rounded bottom is shown at 40, and the end-panel halves at 45*a* and 45*b*. The bottom edges 46 of the end-panel halves in this reflector are spaced from the rounded bottom 40, thus leaving at each end of the reflector a space 49 immediately adjacent the bottom 40. These spaces 49 are used for accommodating the sockets (not shown) that receive the terminals of the double-ended lamp (not shown) normally used in the reflector.

In the FIG. 5 blank, the end-panel half 45*b* at the right-hand side of the bottom arm 27 includes tabs 102 that align with notches 104 in end-panel half 45*a* when the blank is bent into its final reflector configuration. The tabs 102 are then bent into the notches 104 to interlock with the notched regions and thus hold the end-panel halves together.

At the opposite side of the mid-plane 65 the lower end-panel half 45*b* includes a tab 106 that is inserted into slot 108 in the upper end-panel half 45*a* when the blank is bent into its final reflector configuration. The tab 106 is then appropriately bent to interlock with the slotted region and thus hold these two end-panel halves together.

Figure 6:
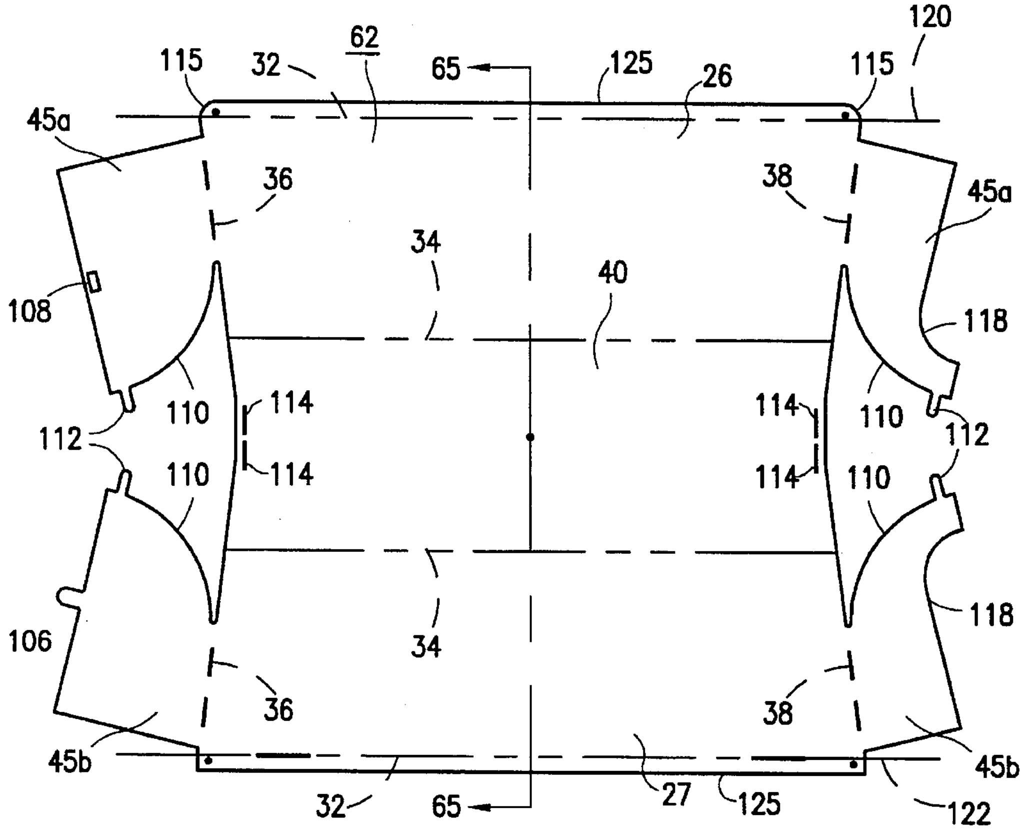
Figure 6A:
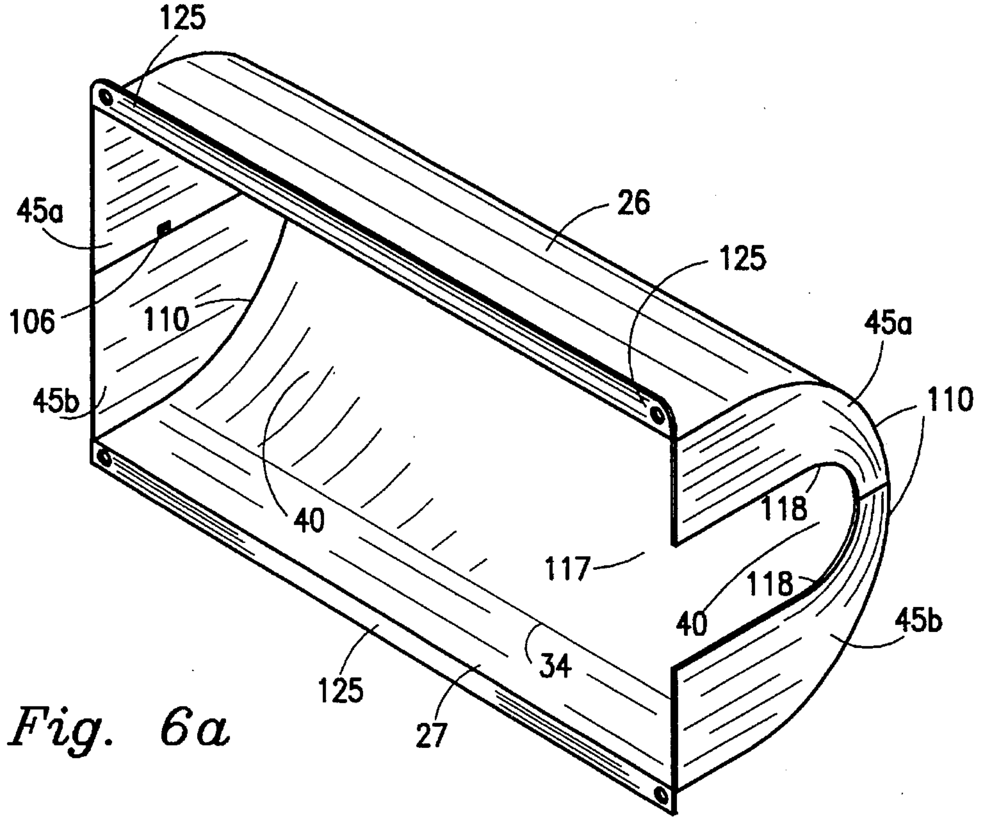
FIG. 6*a* is a simplified perspective view of a reflector made from the blank of FIG. 6.

The FIG. 6 blank is similar to the FIG. 5 blank, in both cases including end-panel halves 45*a* and 45*b* that are joined to arms 26 and 27 at their side edges 36 and 38 and containing a large junction portion 40 that can be bent into a rounded shape to provide a reflector body of more nearly parabolic configuration when the arms 26 and 27 are displaced toward each other in providing a U-shaped form. Each of the end-panel halves 45*a* and 45*b* in the FIG. 6 blank has a rounded bottom edge 110 that matches the rounded U-shaped configuration into which the junction region 40 is bent. After the body portion of the FIG. 6 blank has been bent into a U-shaped form as viewed from central plane 65, the end-panel halves are folded along the dotted fold lines 36 and 38 to form end panels for the trough-shaped reflector. FIG. 6*a* is a simplified perspective view of this reflector.

Referring to FIG. 6*a*, the rounded bottom surfaces 110 of the end-panel halves of this reflector are contiguous with the rounded junction region 40. Tabs 112 (FIG. 6) on the end-panel halves then align with slots 114 in the rounded junction region 40. The tabs 112 are then inserted into the slots 114 and suitably bent over to hold the end-panel halves in their folded positions. Additional fastening is provided by a tab 106 on left-hand end-panel half 45*b* being inserted into a slot 108 in left-hand end-panel half 45*a* and then being bent over.

The reflector of FIG. 6*a* is adapted to receive a single-ended lamp which projects through an opening 117 in one of the end walls 45*a*, 45*b*. This opening 117 is formed from aligned notches 118 in the juxtaposed edges of the section 45*a* and 45*b* when those sections are folded toward each other to form the end wall.

It is to be noted that in all of the embodiments of the invention the fastening means (e.g., 102, 104, 106, 108 110 and 12) for holding together the components of the reflector 14 are integral with one of these components and can easily be assembled and made effective when the blank that is used for the reflector is bent into its desired configuration. It is further noted that these fastening means can easily and quickly be formed as part of the stamping operation used for stamping out the blanks.

It is to be further noted that all of the blanks shown in FIGS. 3, 4, 5, and 6 can be stamped out by a die of appropriate shape at a single station without changing the orientation of the die. There is no need for nesting, or overlapping, of the areas of the metal sheet occupied by adjacent blanks. Where such nesting is relied upon, it is customary to use two separate dies differently oriented, i.e., progressive dies. This involves increased tooling expenses, which my method avoids.

In referring hereinabove and in the accompanying claims to certain components (e.g., the arms 26 and 27 and the end panel portions 45) as being in the general shape of a trapezoid, it is to be understood that this terminology is intended to include shapes which, even though not exactly in the form of a trapezoid, approximate that of a trapezoid. For example, this terminology is intended to comprehend shapes approximately trapezoidal in which the side edges or the bases are not exactly straight lines or in which one or more of the corners of the shape are rounded or beveled. As examples, note that in the blank of FIG. 5 the side edges of the generally trapezoidal upper arm 26 are not exactly straight lines, and in the blank of FIG. 6 the upper corners 115 of the generally trapezoidal upper arm 26 are rounded.

Another way of describing the configuration of the arms 26 and 27 is that each has the shape of a geometric figure that has a major base (32), a minor base (34), and side edges (36 and 38) connecting the ends of the bases via generally convergent paths.

It is also to be understood that this invention in its broader aspects comprehends a method in which the arms 26 and 27 are terminated at their outer ends in narrow flanges that extend along the major bases of the trapezoidal arms. For example, in shaping the blank 62 of FIG. 6 into a reflector, the arms 26 and 27 of the blank are folded along the dot-dash lines 120 and 122, respectively, to form narrow flanges 125 at the outer ends of the arms, which flanges (shown in FIG. 6*a*) can be used for fastening the reflector to the housing.

While I have shown and described particular embodiments of my invention, it will be apparent to those skilled in the art that various other changes and modifications may be made without departing from the invention in its broader aspects; and I, therefore, intend herein to cover all such changes and modifications as fall within the true spirit and scope of my invention.

What I claim is:

1. A method of making a luminaire reflector comprising a trough-shaped body adapted to receive a lamp and end walls at opposite ends of the trough-shaped body, the trough-shaped body comprising spaced-apart arms and a bight joining said arms at one end of the arms, the arms at their opposite ends defining an opening through which light from said lamp is projected by said reflector, the method comprising:

(a) providing a sheet of metal having two generally parallel edges and a mid-plane extending perpendicular to said edges, (b) cutting from said sheet a blank that comprises (i) two primary portions each in the shape of a geometric figure having a major base extending along one of said edges of said sheet, a minor base spaced from said major base, and side edges extending between ends of said major and minor bases via generally convergent paths, (ii) a junction portion interconnecting said minor bases, and (iii) end-paneling portions at opposite sides of said mid-plane, each end-paneling portion comprising a plurality of spaced-apart sections, one joined to a side edge of one of said primary portions and another joined to a side edge of the other of said primary portions, (c) bending said blank into a U-shaped form wherein said primary portions constitute the arms of said trough-shaped body of said reflector and said junction portion constitutes the bight of said body of the reflector, and (d) bending said blank at each of said side edges where an end-paneling section is joined to a primary portion so that the sections of end paneling at each side of said mid-plane meet to form one of said end walls of said reflector, and in which:

(e) bending of the blank into said U-shaped form produces a rounded configuration of said bight, and (f) each of said sections that form one of said end walls has a rounded edge that abuts said rounded bight when the blank is bent to form said trough-shaped body and said end walls, said rounded edges being spaced from said junction portion before the blank is bent.

2. A method of making a luminaire reflector comprising a trough-shaped body adapted to receive a lamp and end walls at opposite ends of the trough-shaped body, the trough-shaped body comprising spaced-apart arms and a bight joining said arms at one end of the arms, the arms at their opposite ends defining an opening through which light from said lamp is projected by said reflector, the method comprising:

(a) providing a sheet of metal having two generally parallel edges and a mid-plane extending perpendicular to said edges, (b) cutting from said sheet a blank that comprises (i) two primary portions each in the shape of a geometric figure having a major base extending along one of such edges of said sheet, a minor base spaced from said major base, and side edges extending between ends of said major and minor bases via generally convergent paths, (ii) a junction portion interconnecting said minor bases, and (iii) end-paneling portions at opposite sides of said mid-plane, each end-paneling portion comprising a plurality of spaced-apart sections, one joined to a side edge of one of said primary portions and another joined to a side edge of the other of said primary portions, (c) bending said blank into a U-shaped form wherein said primary portions constitute the arms of said trough-shaped body of said reflector and said junction portion constitutes the bight of said body of the reflector, and (d) bending said blank at each of said side edges where an end-paneling section is joined to a primary portion so that the sections of end paneling at each side of said mid-plane meet to form one of said end walls of said reflector, and in which:

(e) the end-paneling portion of said blank that constitutes each end-wall of the reflector comprises three sections, a first one of which is joined to a side edge of one of said primary portions, a second one of which is joined to a side edge of the other of said primary portions, and a third one of which is joined to said junction portion of the blank, (f) said blank is bent where said three sections are joined to said primary portions and said junction portion to cause said three sections to form a reflector end wall in which said third section is located between said first and second sections.

3. The method of claim 2 in which each of said geometric figures is in the general shape of a trapezoid.

4. The method of claim 2 in which said third section of each of said end-paneling portions contains a hole that is adapted to receive a lamp-receiving socket in said reflector.

* * * * *